US011988376B2

(12) United States Patent
Herweg

(10) Patent No.: US 11,988,376 B2
(45) Date of Patent: May 21, 2024

(54) LED ILLUMINANT BASED BLINDER WITH LED COLOR MIXING FOR MODELING OF A COLOR DECAY AND LED MODULE THEREFOR

(71) Applicant: ROXX GmbH, Cologne (DE)

(72) Inventor: Michael Herweg, Cologne (DE)

(73) Assignee: ROXX GMBH, Cologne (DE)

( * ) Notice: Subject to any disclaimer, the term of this patent is extended or adjusted under 35 U.S.C. 154(b) by 0 days.

(21) Appl. No.: 18/219,303

(22) Filed: Jul. 7, 2023

(65) Prior Publication Data

US 2024/0019105 A1 Jan. 18, 2024

(30) Foreign Application Priority Data

Jul. 12, 2022 (DE) ..................... 10 2022 117 399.2

(51) Int. Cl.

| | |
|---|---|
| ***F21V 9/08*** | (2018.01) |
| ***F21W 131/406*** | (2006.01) |
| ***F21Y 105/18*** | (2016.01) |
| ***F21Y 113/10*** | (2016.01) |
| ***F21Y 115/10*** | (2016.01) |

(52) U.S. Cl.

CPC ......... *F21V 9/08* (2013.01); *F21W 2131/406* (2013.01); *F21Y 2105/18* (2016.08); *F21Y 2113/10* (2016.08); *F21Y 2115/10* (2016.08)

(58) Field of Classification Search

CPC .... F21V 9/08; F21Y 2105/18; F21Y 2113/10; F21Y 2115/10; F21W 2131/406

See application file for complete search history.

(56) References Cited

PUBLICATIONS

Hyer et al., WO-2004100624-A2, Nov. 2004 (Year: 2004).*
Doe, DE-202009017552-U1, Jun. 2010 (Year: 2010).*
D1—Cluster Blinder https://roxxlight.com/de/cluster-blinder / archived in http://www.archive.org on Jul. 3, 2022.
D2—Cluster Blinder (Screenshot) https://roxxlight.com/de/cluster-blinder / archived in http://www.archive.org on Jul. 3, 2022.
D3—Manual Cluster B4 W.
D4—Extract Homepage Roxx GmbH Extract of the Homepage of the applicant Roxx GmbH—https://roxxlight.com / archived in http://www.archive.org.
D5—Glastonbury Festival 2022 Programme of the Glastonbury Festival 2022—https://www.glastonburyfestivals.co.uk /line-up/line-up-2022// archived in http://www.archive.org.

* cited by examiner

*Primary Examiner* — Mary Ellen Bowman
(74) *Attorney, Agent, or Firm* — Cozen O'Connor

(57) ABSTRACT

A LED module (24) for a blinder (10) having several LEDs (30) of the color warm white, one LED or several LEDs (30) of the color red, and one LED or several LEDs (30) of the color amber.

12 Claims, 4 Drawing Sheets

LED ILLUMINANT BASED BLINDER WITH LED COLOR MIXING FOR MODELING OF A COLOR DECAY AND LED MODULE THEREFOR

BACKGROUND OF THE INVENTION

1. Field of the Invention

The invention refers to a LED illuminant based blinder with LED color mixing for modeling of a color decay, wherein the blinder is suitable for professional lighting technology, as well as to a LED module therefor.

2. Description of the Related Art

For the illumination of events, as e.g. in theatres, stage shows or other events, often professional lighting technology is used, which creates a light composition for the room to be illuminated, often a changing light composition to match a stage show. For this purpose, various lighting components are arranged at suitable locations in the room and are controlled as required. Lighting components used are, apart of spotlights and floodlights, also blinders, stroboscopes, area lights and the like, also in various combinations.

Blinders have, for example, the purpose to emphasize particular moments in a stage show and do this by blinding the audience in a controlled manner, by putting particular areas or regions in an extremely bright light.

Blinders are known in different constructions. In the professional field, blinders in PAR construction are used, which comprise a reflector (parabolic mirror) in their housing, which focusses and guides the light beam. Such blinders have ACL-illuminants (ACL: Aircraft Landing Lamp) or use halogen based illuminants in general (incandescent lamps), which allow the blinders to have big sizes and high power.

Taking into account the advanced development of LED technology, blinders as so-called matrix blinders are known, in particular from the hobby sector, wherein LEDs form the illuminants, wherein the LEDs are arranged in a plurality of rows on top and below of each other. It is intended to mimic the characteristics of conventional blinders as much as possible, using modern LED technology, which is necessary for acceptance of LED based blinders in the professional field.

LED illuminants are characterized by a rapid response behavior, in contrast to halogen based illuminants, which, however, is not desired and not typical for professionally used blinders. Therefore, when using blinders which rely on LED technology, the LEDs are, e.g. by using PWM modulation, switched on and off with high frequency for mimicking the impression of conventional blinders and to circumvent the rapid response behavior, such that the impression of a dimming function (curve) of a conventional, halogen illuminant based, blinder results for the human eye, i.e. the dimming degree desired is achieved for the human eye. This means, the fade-in-behavior and the decay behavior of the conventional halogen illuminant based blinder is mimicked using a suitable dimming curve. This, in general, enables the use of LED illumination technology for professional blinders.

It is, however, desired to mimic the color curve known from blinders using halogen based illuminants when using LED based illuminants for blinders, in addition to the temporal fade-in and fade-off behavior, if possible. When using traditional halogen illuminants, the light is created because of a glowing wire—the more current is applied, the more the wire glows. Weak glowing light has, like fire, a deeply reddish glow, strong glowing light tends more and more towards white or bluish light, respectively.

Therefore, for mimicking of different light colors, a RGB (red, green, blue) LED combination is used. For this purpose, the single color chips are directly arranged on a circuit board such that a good mixture of colors and a desired weighting of the single colors is obtained.

When using the blinders, e.g. for obtaining the conventional blinder effect, the LEDs of the colors green and blue provided for modelling the color decay behavior are, however, needed only to a very limited or small extent and used, because there, green and blue parts are only rarely included. On the other hand, the LEDs of the colors green and blue occupy space on the circuit board, i.e. the LEDs of these colors are not helpful in obtaining the needed, very high total illumination power, so that the use of LED based blinders in the professional field remains difficult.

SUMMARY OF THE INVENTION

It is, therefore, an object of the invention to provide a LED based blinder which mimics the fade-in and fade-out behavior and the color curve correlated therewith of conventionally used halogen illuminant based blinders and which can, at the same time, achieve a high overall illumination power, as well as to provide a LED module for such blinder.

The invention is based on the idea of using a color combination of the LEDs, which color combination is optimized for the blinder effect, such that the LEDs can be used in a large extent both for obtaining the blinder effect and for modelling of the color decay behavior, which both correspond to those of conventional, halogen illuminant based blinders. For this purpose, the LED chip colors warm white, amber and red are combined. These three colors are distributed on the circuit board with different weighting, such that a good mixture of the colors results and, at the same time, the total illumination power clearly exceeds that of halogen light, while having lower current supply. By doing so, a nearly perfect emulation of the previously used halogen illuminant is achieved.

Thus, according to the invention, the LED module for a blinder comprises a plurality of LEDs of the color warm white, one LED or a plurality of LEDs of the color red, and one LED or a plurality of LEDs of the color amber. The LEDs of the color warm white particularly serve for generating the conventional blinder effect, i.e. to provide at high illumination power very bright light for determined areas of a room, which are to be illuminated. At the same time, the LEDs of the color warm white, as well as the LEDs of the color red and amber, are used at the blinder using a respective control for mimicking the color decay behavior of a halogen illuminant based blinder with a respective control logic. This means that it is not necessary to provide space on the circuit board for LEDs of the colors green and blue, if these are not desired for obtaining color effects, but would have been provided exclusively for modelling the respective color decay behavior. Accordingly, the circuit board of the LED module can be optimally used, in particular with regard to generating a high illumination power with LED technology.

Preferably, on the LED module, the number of LEDs of the color warm white, the number of LEDs of the color red and of the LEDs of the color amber exceeds 66% of the total number of LEDs of the LED module, further preferably exceeds 75%. If no additional color customization for the blinder effect of the blinder is necessary or desired, it is particularly advantageous if the LED module exclusively comprises LEDs of the color warm white, LEDs of the color red and LEDs of the color amber. With such arrangement, the entire available circuit board can be used for the generation of the light power desired for the blinder effect, avoiding that space is needed for providing LEDs only needed for modelling the decay behavior, and, simultaneously, a decay behavior can be modelled with regard to the color effects, which is similar to that of conventional halogen illuminants (transition from white or bluish light, respectively, to reddish light when switching off).

Depending on the desired application, additional LEDs of the color green and/or LEDs of the color blue can be provided for generating particular colors with the blinder. This allows to model different light colors, which are desired for the blinder effect. The color decay behavior is, however, not mainly modelled using these additional LEDs of different colors, i.e. the colors green or blue, but by the LEDs of the color red, amber and warm white.

Preferred dominant wave lengths (peak wave lengths) of the LEDs are within the following ranges: for LEDs of the color red in the range from 624 nm to 634 nm and for LEDs of the color amber in the range from 585 nm to 600 nm. These combinations result in particularly good and naturally perceived colors, i.e. very similar to those of halogen based illuminants, when modelling the decay behavior.

The LEDs of the color warm white have a CRI (Color Rendering Index) of 80 in a preferred embodiment. A CRI of 100 means no color distortion by means of the LED light with respect to natural light. In view of the balance between color effect and nominal power of LEDs this has shown to be appropriate for blinders. The LEDs of the color warm white have, further preferably, a color temperature of 3000K (CCT value).

If additional LEDs of the colors green and/or blue are used, the LEDs of the color green preferably have a dominant wave length in the range from 520 nm to 540 nm, the LEDs of the color blue have a dominant wave length in the range from 440 nm to 460 nm.

The blinder comprising the LED module preferably further comprises a control which is adapted to control the LEDs of the color amber, red and warm white such that, when the blinder is switched off, the color decay behavior of a halogen illuminant blinder is modelled by switching on and switching off the LEDs with high frequency. This allows to mimic the impression of conventional blinders and the rapid response behavior inherent to LEDs can be avoided, since the impression of the decay function of a conventional halogen illuminant based blinder arises for the human eye by using the high frequent switching on and switching off, preferably using PWM modulation, both with regard to the dimming degree of the blinder and with regard of its color when fading in and fading off.

In a particularly preferred embodiment, the control of the LEDs of the color warm white is such that the power emitted by the LEDs of the color warm white decreases with a substantially exponential function. The control of the LEDs of the color amber is such that the power emitted by the LEDs of the color amber initially increases, when the LEDs of the color warm white decrease, until a maximum decay power of the LEDs of the color amber is reached, and subsequently decreases with a substantially exponential function, and the control of the LEDs of the color red is such that the power emitted by the LEDs of the color red is substantially zero, until the maximum decay power of the LEDs of the color amber is reached, subsequently increases until a maximum decay power of the LEDs of the color red is reached and subsequently decreases with a substantially exponential function. This results in a particularly good imitation of a halogen illuminant regarding the transition between bluish white and reddish colors upon decay.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following, the invention is described by way of example taking into account the attached figures, in which.

DETAILED DESCRIPTION OF THE DISCLOSED EMBODIMENTS

Figure 1:
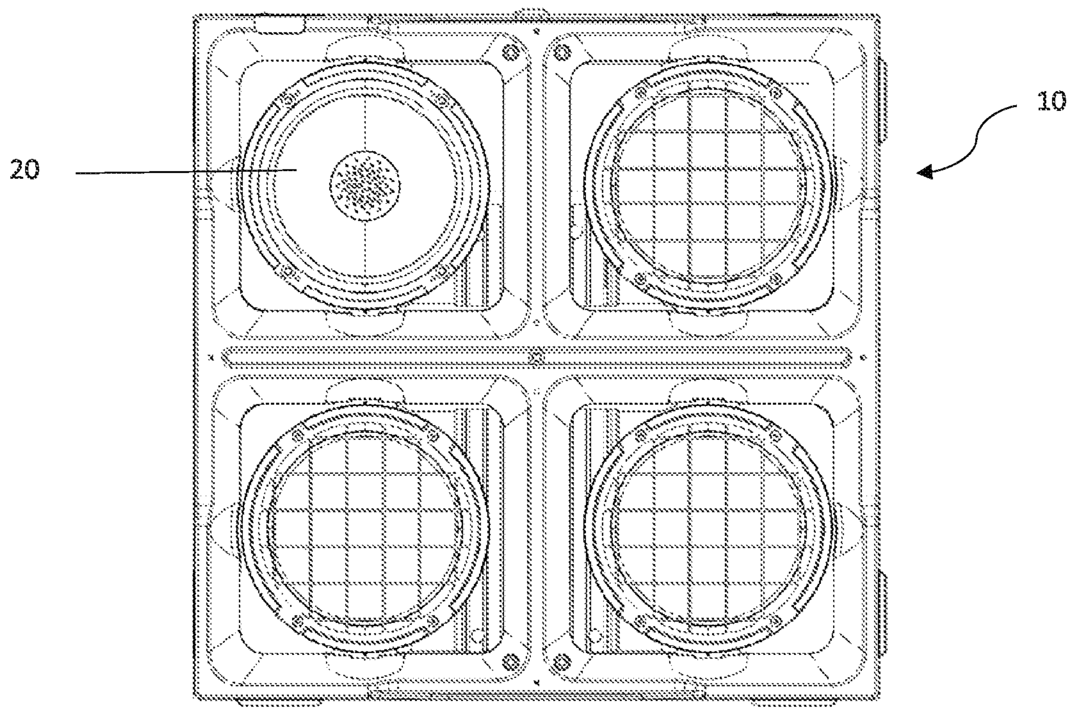
FIG. 1 shows a blinder with four groups in top view, wherein the front cover is removed at one member for illustration purposes.

FIG. 1 shows a blinder 10 with four groups, i.e. a blinder having four lighting elements 20, which comprise a group of LEDs, respectively. Instead of the four lighting elements 20, which are shown in FIG. 1, it is in general also possible to group another number of lighting elements 20 to a blinder 10, for example two or six. The front cover of the lighting element 20 shown in the upper left corner is removed in the drawing in FIG. 1 for illustration purposes.

Figure 2:
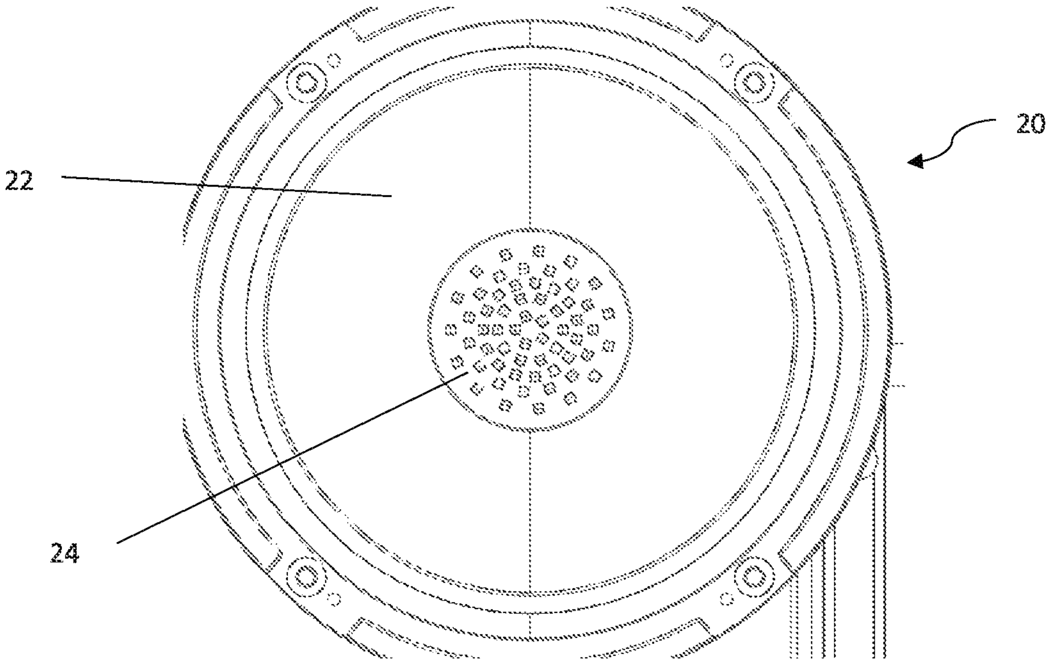
FIG. 2 shows a detail of FIG. 1.

FIG. 2 shows the lighting element of the top left corner of FIG. 1 in top view. The lighting element 20 comprises a central LED module 24, which has a circular basis face on which the LEDs are placed. Around this circular basis face a reflector member 22 is arranged in a concentric manner and opens conically in light emitting direction.

The LED module 24 additionally comprises control and monitoring members (not shown in FIGS. 1 and 2) on a circuit board, apart of the circular area 24, where the LEDs are provided.

Figure 6:
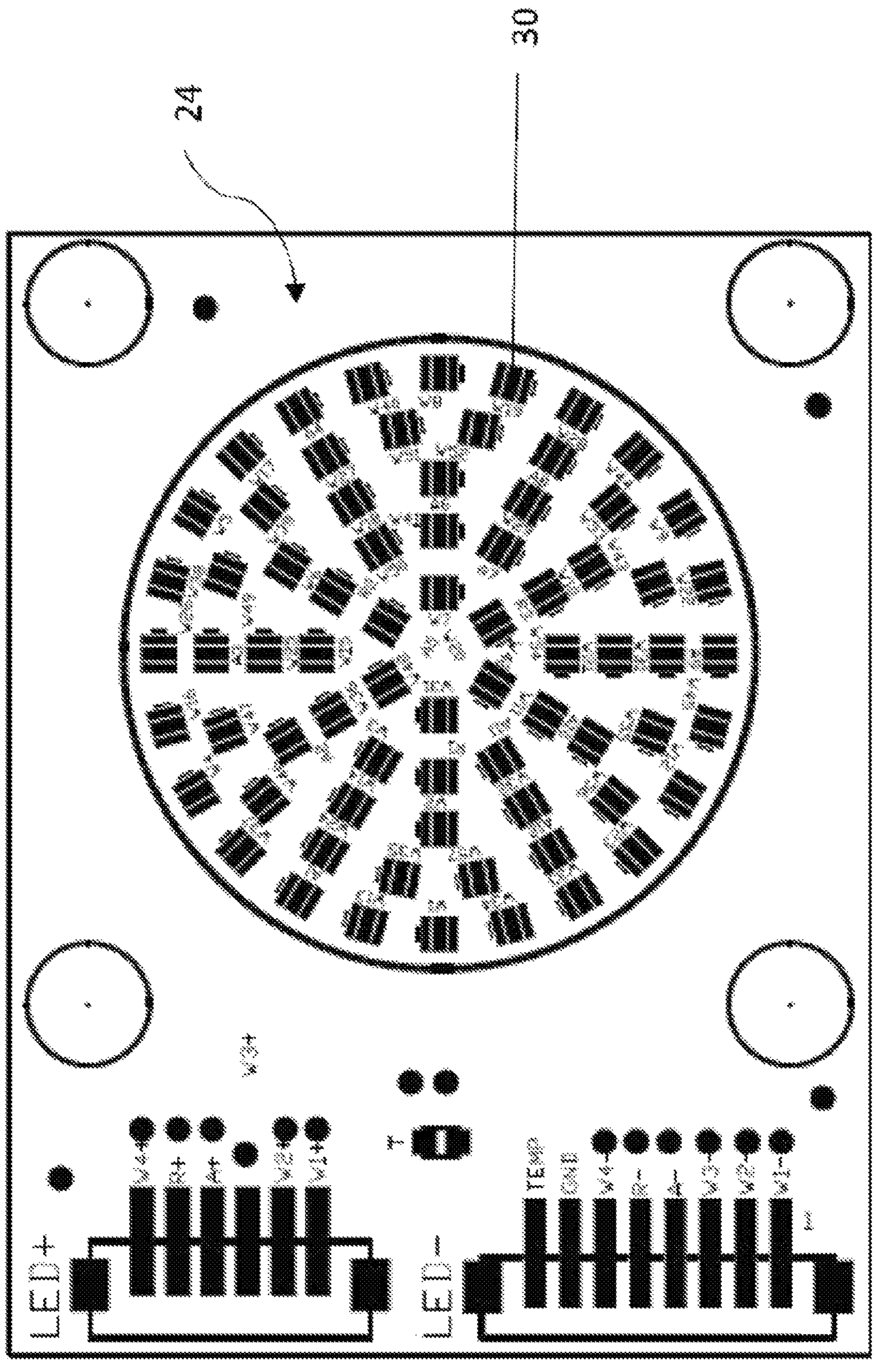
FIG. 6 schematically shows an embodiment of a circuit board for a LED module according to the invention.
Figure 7:
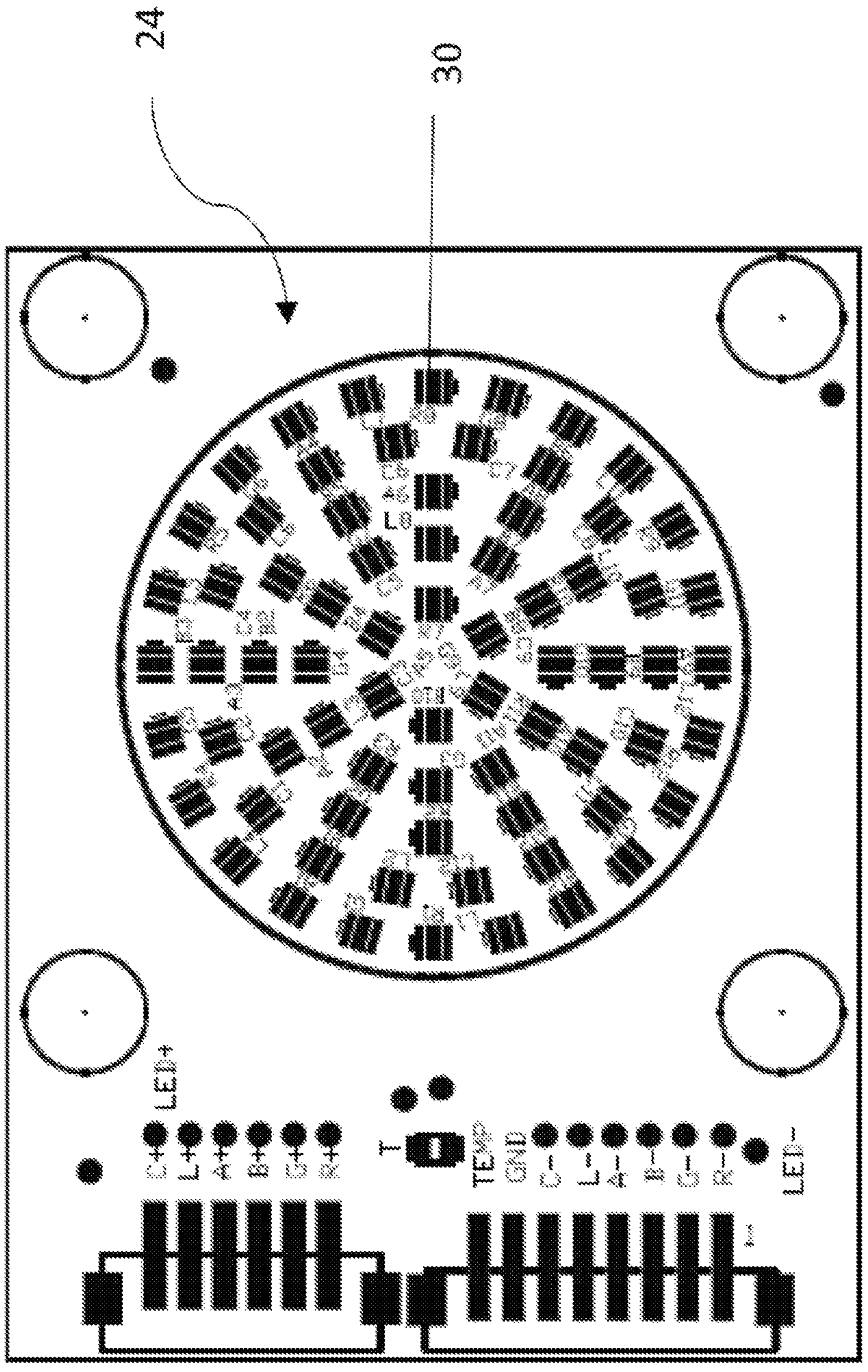
FIG. 7 schematically shows a further embodiment of a circuit board of a LED module according to the invention.

FIGS. 6 and 7 show the exemplary arrangement of the LEDs 30 on the circuit board of the LED module 24 for two embodiments, respectively.

FIG. 6 shows an embodiment where 72 LEDs 30 are provided in total, which are arranged in five concentric circles. In the embodiment according to FIG. 6 exclusively LEDs of the color warm white (denoted with W1-W57), of the color amber (denoted with A1-A12) and of the color red (denoted with R1-R3) are provided on the circuit board in a distributed manner. In particular, the major part of the LEDs 30 is provided in the color warm white (57 pieces) and corresponds to more than % of the total number of the LEDs provided.

The LEDs of the color red (3 pieces) are provided rather close to the center of the arrangement, in particular on the second circle starting from the center and evenly distributed in circumferential direction, whereas the LEDs of the color amber (12 pieces) are distributed both in radial and in circumferential direction. With this distribution it is possible, when modelling the color decay behavior which is to correspond to that of a blinder with conventional halogen illumination technology, to not only mimic the color decay curve when dimming per se, but to also mimic the increasing concentration of reddish colors towards the center with increasing dimming.

In the embodiment according to FIG. 7 there are additionally provided to the LEDs 30 of the colors red, amber and warm white LEDs or the colors green and blue. As in the embodiment according to FIG. 6, there are provided 72 LEDs 30 in total, wherein the LEDs 30 are provided in five concentric circles on the circuit board of the LED module 24. There are provided 12 LEDs of the colors amber, red, green and blue, respectively, and 24 LEDs of the color warm white. This means that the number of LEDs of the color warm white is double than the number of LEDs of the other colors amber, red, green and blue, respectively. In this embodiment, all colors are substantially evenly distributed both in radial direction and in circumferential direction.

While the blinder effect, i.e. the extremely bright illumination of particular areas of a room, is produced in the color white, when using the blinder 10 having the LED arrangement according to FIG. 6, the arrangement according to FIG. 7 allows for producing the blinder effect in different colors, by specifically controlling separate, particular LEDs of particular colors. However, this results in a lower total power emitted as for the blinder 10 having the LED arrangement of FIG. 6, which has an impact on the achievable brightness.

Figure 3:
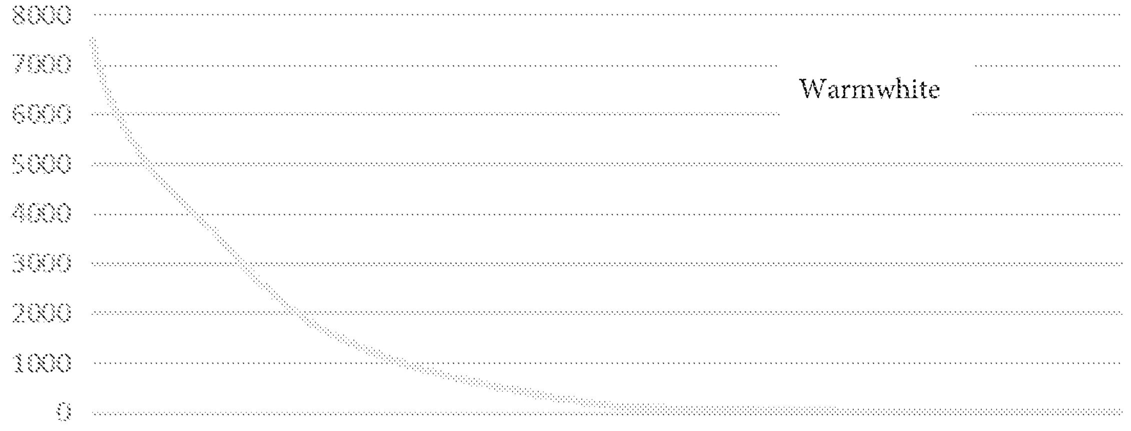
FIG. 3 shows an exemplary dimming curve of the LEDs of the color warm white.
Figure 4:
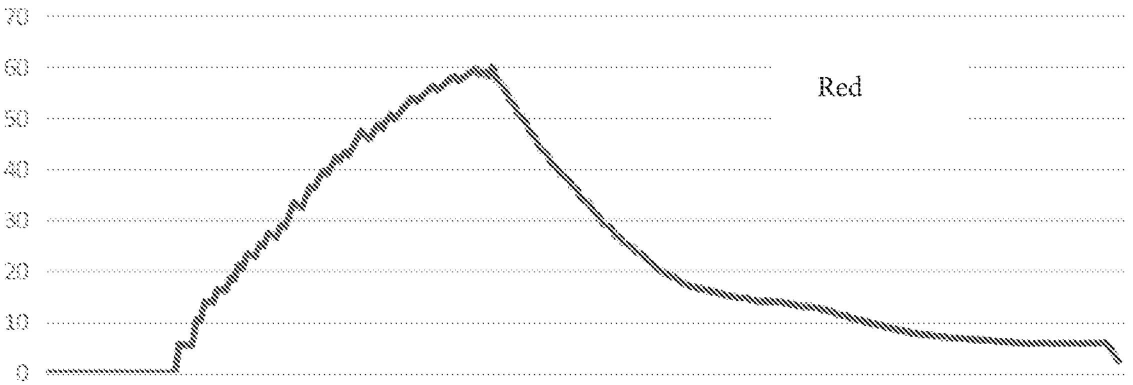
FIG. 4 shows an exemplary dimming curve of the LEDs of the color red.
Figure 5:
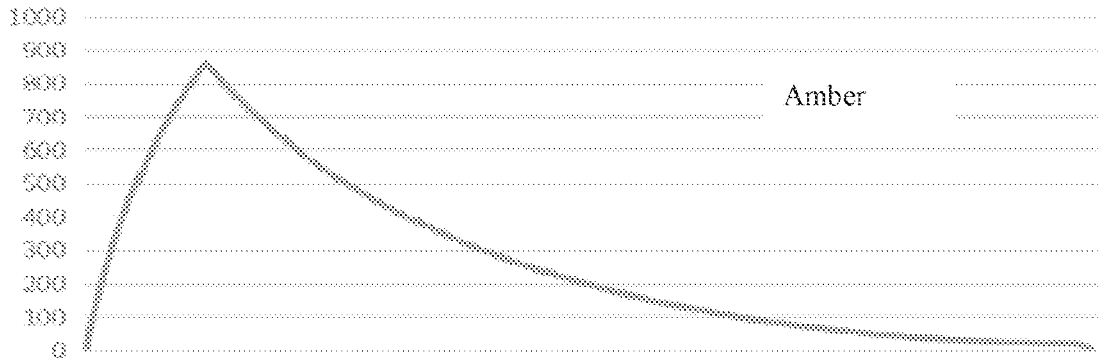
FIG. 5 shows an exemplary dimming curve of the LEDs of the color amber.

In both embodiments the LEDs of the colors red, amber and warm white are specifically controlled for generating a switch-off or decay behavior corresponding to that of a conventional blinder with halogen illuminants. The LEDs of the colors green and blue (in the case of the embodiment of FIG. 7) are not used for this purpose. FIGS. 3 to 5 show exemplary dimming curves (light power on the y-axis, time on the x-axis) for the colors warm white (FIG. 3), red (FIG. 4) and amber (FIG. 5). By increasing the red share of the emitted light with initially increasing colors amber and slightly delayed red and simultaneous decrease of the warm white share of the light, over and with advancing decay time, a color decay behavior is generated which substantially corresponds to that of a halogen light source and which mimics the reddish afterglow of an incandescent wire. For this purpose the LEDs are preferably controlled using pulse width modulation (PWM) corresponding to the frequent switching on and switching of, wherein the pulse width is correspondingly adjusted.

The terms “approximately”, “about”, “circa”, “substantially” or “in general”, which are used here in combination with a detectable value, e.g. a parameter, an amount, a shape, a timely duration and the like, include deviations and variations of ±10% or less, preferably ±5% or less, further preferably ±1% or less and still further preferably ±0.1% or less of the respective value, as long as these deviations are technically reasonable. It is explicitly mentioned that the value to which “about” refers, is disclosed as exact value, as well. The indication of ranges by start and end values includes all these values and partial values which are included in these ranges, including start and end values.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An LED module for a blinder comprising several LEDs of the color warm white, one LED or several LEDs of the color red, and one LED or several LEDs of the color amber, and a control, wherein the control is adapted to control the LEDs (30) of the colors amber, red and warm white, when the blinder is switched off such that the color decay behavior of a halogen illuminant based blinder is mimicked, the control of the LEDs of the color warm white being such that the emitted power of the LEDs of the color warm white decreases substantially exponentially, the control of the LEDs of the color amber being such that the emitted power of the LEDs of the color amber initially increases with starting decrease of the LEDs of the color warm white, until a maximum decay power of the LEDs of the color amber is reached, and subsequently decreases substantially exponentially, and the control of the LEDs of the color red being such that the emitted power of the LEDs of the color red is substantially zero until the maximum decay power of the LEDs of the color amber is reached, subsequently increases until a maximum decay power of the LEDs of the color red is reached, and subsequently decreases substantially exponentially.

2. The LED module according to claim 1, wherein the number of LEDs of the color warm white, of the LEDs of the color red and of the LEDs of the color amber is more than 66% or the total number of LEDs of the LED module.

3. The LED module according to claim 1, comprising exclusively LEDs of the color warm white, LEDs of the color red and LEDs of the color amber.

4. The LED module according to claim 1, further comprising LEDs of the color green and/or LEDs of the color blue.

5. The LED module according to claim 1, wherein the LEDs of the color red have a dominant wave length in the range of 624 nm to 634 nm.

6. The LED module according to claim 1, wherein the LEDs of the color amber have a dominant wave length in the range of 585 nm to 600 nm.

7. The LED module according to claim 1, wherein the LEDs of the color warm white have a CRI (Color Rendering Index) of 80.

8. The LED module according to claim 1, wherein the LEDs of the color warm white have a color temperature of 3000K (CCT value).

9. The LED module according to claim 4, wherein the LEDs of the color green have a dominant wave length in the range of 520 nm to 540 nm.

10. The LED module according to claim 4, wherein the LEDs of the color blue have a dominant wave length in the range of 440 nm to 460 nm.

11. The LED module according to claim 10, wherein the control is PWM based.

12. A blinder comprising an LED module according to claim 1.

* * * * *